Nov. 30, 1926.
M. CHRISTENSEN
BOOK STITCHING MACHINE
Filed Jan. 2, 1926
1,608,838
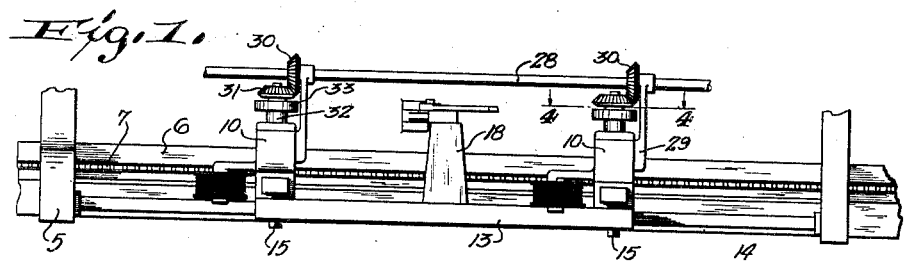
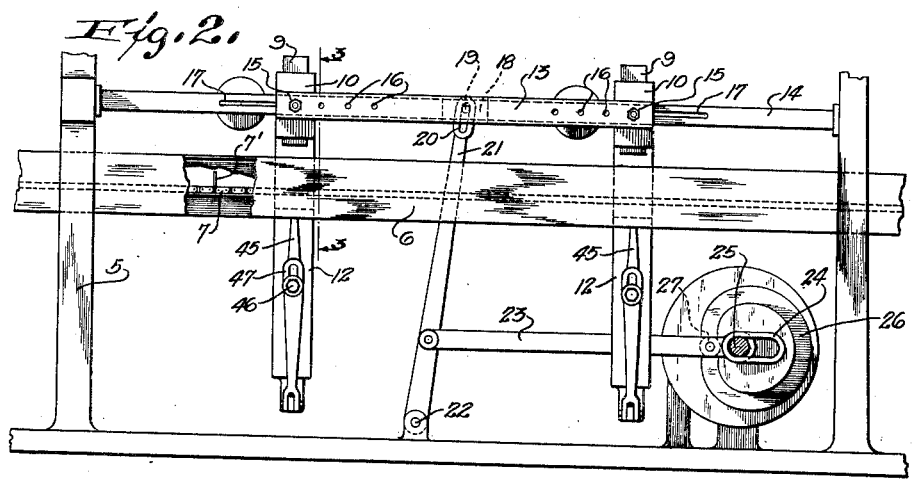
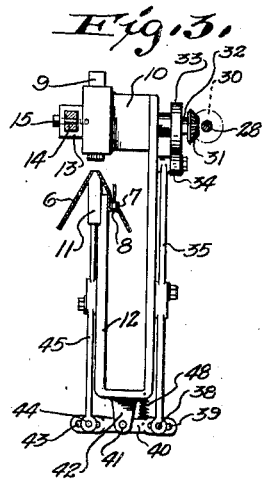 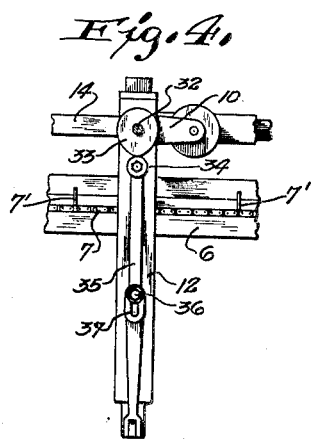
INVENTOR.
Martin Christensen
BY
Louis O. French
ATTORNEY.

Patented Nov. 30, 1926.

1,608,838

UNITED STATES PATENT OFFICE.

MARTIN CHRISTENSEN, OF ELMHURST, ILLINOIS, ASSIGNOR TO THE CHRISTENSEN MACHINE COMPANY, OF RACINE, WISCONSIN, A CORPORATION OF WISCONSIN.

BOOK-STITCHING MACHINE.

Application filed January 2, 1926. Serial No. 78,925.

The invention relates to book-stitching machines.

The object of the invention is to provide a machine wherein the books are stitched simultaneously with their progress through the machine by the stitchers which move with them during the stitching, each stitcher including the stapling and clincher mechanism associated as a unit, these units being adjustable relative to each other so that various kinds and sizes of work may be handled on the same machine.

The invention further consists in the several features hereinafter set forth and more particularly defined by claims at the conclusion hereof.

In the drawings, Fig. 1 is a plan view of mechanism embodying the invention;

Fig. 2 is an elevation view thereof;

Fig. 3 is a detail sectional view taken on the line 3—3 of Fig. 2;

Fig. 4 is a detail sectional view taken on the line 4—4 of Fig. 1.

In the drawings the numeral 5 designates a part of the frame of the machine, 6 the signature- or book-supporting saddle, suitably supported on the frame, 7 the endless feed conveyor for carrying the books through the stitching section of the machine and having pins 7' spaced at appropriate intervals to engage the adjacent edge of the book or group of signatures, said conveyor having its upper run moving in a recess 8 in the saddle.

Each stitcher unit comprises the stapling mechanism 9, including the stitcher head 10, disposed above the groups of signatures and clincher mechanism 11 associated with the saddle 6. The details of these mechanisms are of known construction, but in the present instance these mechanisms are associated in a novel manner to move as a unit and to operate on the books while they are advancing along the saddle.

For this purpose frames or housings of stapling mechanism 9 and the clinched mechanisms are connected by a frame or yoke member 12, whereby the stitcher-head 10 supports the clinchers and the clinchers will thus reciprocate with the stitcher-head 10.

These stitcher units are adjustably connected to a reciprocating bar 13 which is slidably mounted on a fixed guide and supporting bar 14 secured to the frame 5 of the machine. To adjustably secure the stitcher units to the bar 13, I show a bolt 15 passing through one of a series of holes 16 in the bar 13 and into the stitcher-head 10, and slidably mounted in a slot 17 in the bar 14.

The reciprocation of the bar 13, so as to move said bar in proper synchronism with the signature feed, may be accomplished in any suitable manner, and for the purpose of illustration I show a lug 18 on the bar 13 carrying a pin 19 mounted in the slotted upper end 20 of a lever 21 having its lower end pivoted at 22 to the frame and pivotally connected intermediate its ends to an actuating rod 23 which has a slotted end 24 working over a driven shaft 25 carrying a grooved cam 26 in which a roller 27 on said rod works.

A splined stitcher drive shaft 28 is suitably mounted adjacent the stitching mechanism and each stitcher-head has a bracket 29 carrying a gear 30 mounted to slide on and be driven by said shaft 28. Each gear 30 meshes with a gear 31 on the stapler drive shaft 32 whereby the stapling mechanism is driven, and this shaft 32 carries a cam 33 engaging a roller 34 on a vertically-reciprocating tappet rod 35. This rod is guided intermediate its ends by a bolt 36 on the frame member 12 working in a slot 37 in said rod, and the lower end of said rod is operatively connected by a pin-and-slot connection 38, 39 with one end of a lever 40 pivotally carried intermediate its ends on a pin 41 secured to lugs 42 on the transverse portion of the yoke member 12. The other end of said lever is connected by a slot-and-pin connection 43, 44 to the lower end of the clincher-operating rod 45 which is guided intermediate its ends by a bolt 46 on the frame member 12 working in a slot 47 in said rod. A tension spring 48 secured to the frame 12 and the rear end of the lever 40 exerts force thereon to keep the roller 34 on the rod 35 in cam-engaging position. Thus, the cam 33 acts through the rod 35, lever 40 and rod 45 to actuate the clinchers at the proper time.

Thus, as the stitchers move forward with the groups of signatures travelling along the conveyor, they are actuated from the shaft 28 to insert and clinch the staples in the book through the mechanism above described, and by changing the spacing of the stitcher units relative to each other various kinds and sizes of work can be handled on the same machine.

I desire it to be understood that this invention is not to be limited to any particular form or arrangement of parts except in so far as such limitations are specified in the claims.

What I claim as my invention is:

1. In a saddle-stitch book-stitching machine, the combination with the signature-conveying mechanism, of reciprocating stitching mechanism movable with said conveying mechanism during the stitching operation comprising stapling mechanism and clincher mechanism connected together to move as a unit, said clincher mechanism moving inside the book, means for moving said units with the work, and means for actuating said stapling and clincher mechanisms during their movement with the work.

2. In a saddle-stitch book-stitching machine, the combination with the signature-conveying mechanism, of reciprocating spaced stitchers connected to move together, each stitcher including a stitcher-head and clincher mechanism carried by said head and moving inside the book, means for bodily reciprocating said stitchers, and means for actuating said stitchers during their movement with the work.

3. In a saddle-stitch book-stitching machine, the combination with the signature-conveying mechanism, of reciprocating spaced stitchers adjustably connected together and movable with said conveying mechanism during the stitching operation, each of said stitchers comprising stapling mechanism and clincher mechanism connected together to move as a unit, said clincher mechanism moving inside the book, means for moving said spaced stitchers with the work, and means for actuating said stapling and clincher mechanisms during their movement with the work.

4. In a saddle-stitch book-stitching machine, the combination with the signature-supporting-and-conveying mechanism, of spaced stitchers connected to move together and with the work in one direction, each stitcher including a stitcher-head, clincher mechanism moving inside the book and a yoke member supporting said clincher mechanism from the stitcher-head, means for bodily reciprocating said stitchers, and means for actuating said stitchers during their movement with the work.

5. In a saddle-stitch book-stitching machine, the combination with the signature-supporting-and-conveying mechanism, of spaced stitchers connected to move together and with the work in one direction, each stitcher including a stitcher-head, clincher mechanism moving inside the book and a member supporting said clincher mechanism from the stitcher-head, means for bodily reciprocating said stitchers, and means for actuating each of said stitchers during their movement with the work, including clincher-actuating mechanism carried by said member.

In testimony whereof, I affix my signature.

MARTIN CHRISTENSEN.